US011244639B2

(12) United States Patent
Shi et al.

(10) Patent No.: US 11,244,639 B2
(45) Date of Patent: Feb. 8, 2022

(54) DISPLAY PANEL AND DRIVING METHOD THEREOF, AND DISPLAY SYSTEM

(71) Applicants: Fuzhou BOE Optoelectronics Technology Co., Ltd., Fujian (CN); BOE TECHNOLOGY GROUP CO., LTD., Beijing (CN)

(72) Inventors: Changhong Shi, Beijing (CN); Jin Wang, Beijing (CN); Wenchang Tao, Beijing (CN); Zongxiang Li, Beijing (CN); Jiamin Liao, Beijing (CN); Min Zhou, Beijing (CN); Yao Liu, Beijing (CN); Hongjiang Wu, Beijing (CN); Zuwen Liu, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/980,169

(22) PCT Filed: Dec. 20, 2019

(86) PCT No.: PCT/CN2019/127128
§ 371 (c)(1),
(2) Date: Sep. 11, 2020

(87) PCT Pub. No.: WO2020/151434
PCT Pub. Date: Jul. 30, 2020

(65) Prior Publication Data
US 2021/0012723 A1 Jan. 14, 2021

(30) Foreign Application Priority Data
Jan. 21, 2019 (CN) .......................... 201920093060.0

(51) Int. Cl.
*G09G 3/34* (2006.01)
*G02F 1/1335* (2006.01)
(Continued)

(52) U.S. Cl.
CPC ........... *G09G 3/346* (2013.01); *G02F 1/1368* (2013.01); *G02F 1/133555* (2013.01);
(Continued)

(58) Field of Classification Search
CPC .... G09G 3/346; G09G 3/2074; G09G 3/3406; G09G 2300/0456; G09G 2300/0469;
(Continued)

(56) References Cited

U.S. PATENT DOCUMENTS 9,008,472 B2 * 4/2015 Chang ................... G02B 6/0043
385/31
9,239,508 B2 * 1/2016 Feng ..................... G02F 1/1335
(Continued)

FOREIGN PATENT DOCUMENTS

CN     101395928 A      10/2008
CN     205809490     * 12/2016
(Continued)

*Primary Examiner* — Ricardo Osorio
(74) *Attorney, Agent, or Firm* — Procopio, Cory, Hargreaves & Savitch, LLP

(57) ABSTRACT

A display panel includes a plurality of sub-pixels. At least one sub-pixel of the plurality of sub-pixels includes a first electrode, a light modulation structure disposed on a side of the first electrode, and a second electrode disposed at a side of the light modulation structure away from the first electrode. The light modulation structure includes a refractive index adjustment layer, and a light modulation layer disposed between the refractive index adjustment layer and the first electrode. A refractive index of the refractive index adjustment layer is changed under action of an electric field between the first electrode and the second electrode. The (Continued)

light modulation layer is in contact with the refractive index adjustment layer, and at least a part of a surface of the light modulation layer that is in contact with the refractive index adjustment layer is a curved face.

16 Claims, 8 Drawing Sheets

(51) Int. Cl.
    *G02F 1/1362* (2006.01)
    *G02F 1/1368* (2006.01)
    *G09G 3/20* (2006.01)

(52) U.S. Cl.
    CPC .. *G02F 1/136209* (2013.01); *G02F 1/136286* (2013.01); *G09G 3/2074* (2013.01); *G09G 3/3406* (2013.01); *G09G 2300/0456* (2013.01); *G09G 2300/0469* (2013.01); *G09G 2300/08* (2013.01); *G09G 2330/02* (2013.01)

(58) Field of Classification Search
    CPC ............ G09G 2300/08; G09G 2330/02; G02F 1/133555; G02F 1/136209; G02F 1/136286; G02F 1/1368
    See application file for complete search history.

(56) References Cited

U.S. PATENT DOCUMENTS

| | | | |
|---|---|---|---|
| 9,395,480 B2* | 7/2016 | Tang | C08J 5/18 |
| 9,921,347 B2* | 3/2018 | Kuriyama | B05D 3/12 |
| 2006/0068329 A1* | 3/2006 | Aylward | G02F 1/1333 |
| | | | 430/311 |
| 2009/0033812 A1 | 2/2009 | Ijzerman et al. | |
| 2009/0316100 A1* | 12/2009 | Sato | G09G 3/3648 |
| | | | 349/143 |
| 2010/0177025 A1* | 7/2010 | Nagata | G09F 9/35 |
| | | | 345/76 |
| 2017/0059876 A1 | 3/2017 | Kim | |
| 2019/0011764 A1* | 1/2019 | Liang | G02F 1/133512 |
| 2021/0012723 A1 | 1/2021 | Shi et al. | |

FOREIGN PATENT DOCUMENTS

| | | |
|---|---|---|
| CN | 205809496 U | 12/2016 |
| CN | 106405950 A | 2/2017 |
| CN | 106483670 A | 3/2017 |
| CN | 209148998 U | 7/2019 |
| JP | 2016040569 A | 3/2016 |

\* cited by examiner

DISPLAY PANEL AND DRIVING METHOD THEREOF, AND DISPLAY SYSTEM

CROSS-REFERENCE TO RELATED APPLICATIONS

This application is a national phase entry under 35 USC 371 of International Patent Application No. PCT/CN2019/127128 filed on Dec. 20, 2019, which claims priority to Chinese Patent Application No. 201920093060.0, filed on Jan. 21, 2019, which are incorporated herein by reference in their entirety.

TECHNICAL FIELD

The present disclosure relates to the field of display technologies, and in particular, to a display panel and a driving method thereof, and a display system.

BACKGROUND

In the field of display technologies, by controlling deflection of liquid crystal molecules, display can be achieved, and gray scales of displayed images can be controlled. Holographic display is taken as an example, in existing holographic display devices, holographic interference images can be loaded by using a liquid crystal spatial light modulator.

SUMMARY

In one aspect, a display panel is provided. The display panel includes a plurality of sub-pixels, and at least one sub-pixel of the plurality of sub-pixels includes: a first electrode, a light modulation structure disposed on a side of the first electrode, and a second electrode disposed at a side of the light modulation structure away from the first electrode. The light modulation structure includes a refractive index adjustment layer and a light modulation layer. A refractive index of the refractive index adjustment layer is changed under action of an electric field between the first electrode and the second electrode. The light modulation layer is disposed between the refractive index adjustment layer and the first electrode, the light modulation layer is in contact with the refractive index adjustment layer, and at least a part of a surface of the light modulation layer that is in contact with the refractive index adjustment layer is a curved face.

In some embodiments, the light modulation layer includes a plurality of protrusions. The plurality of protrusions are distributed on a surface of the first electrode facing the refractive index adjustment layer; and a surface of at least one protrusion of the plurality of protrusions that is in contact with the refractive index adjustment layer is a curved face.

In some embodiments, the plurality of protrusions are arranged in an array, and shapes and sizes of the plurality of protrusions are the same.

In some embodiments, the plurality of protrusions are arranged in a matrix, and shapes and sizes of the plurality of protrusions are the same.

In some embodiments, the surface of the at least one protrusion of the plurality of protrusions that is in contact with the refractive index adjustment layer is a hemispherical face.

In some embodiments, a material constituting the refractive index adjustment layer includes an electro-optic crystal material.

In some embodiments, each sub-pixel of the plurality of sub-pixels includes the first electrode, the light modulation structure and the second electrode; and all second electrodes included in the plurality of sub-pixels are connected together to form a single entire layer.

In some embodiments, the display panel further includes: a base substrate; and a plurality of gate lines and a plurality of data lines disposed in the display panel. The plurality of gate lines and the plurality of data lines cross horizontally and vertically to define a plurality of sub-pixel regions for accommodating the plurality of sub-pixels.

In some embodiments, the display panel further includes a transistor disposed in each sub-pixel region of the plurality of sub-pixel regions. A gate of the transistor is electrically connected to a corresponding gate line of the plurality of gate lines, a first electrode of the transistor is electrically connected to a corresponding data line of the plurality of data lines, and a second electrode of the transistor is electrically connected to the first electrode of a sub-pixel in the sub-pixel region where the transistor is located.

In some embodiments, the display panel further includes a black matrix. The black matrix is disposed on a side of the second electrode away from the first electrode. The black matrix covers at least a part of the transistor; and/or, the black matrix covers at least a part of the plurality of gate lines and at least a part of the plurality of data lines.

In some embodiments, the display panel further includes a power supply electrode. The power supply electrode is electrically connected to the second electrode, and the power supply electrode is configured to supply a common voltage to the second electrode.

In some embodiments, the display panel further includes a color filter layer. The color filter layer is disposed on a side of the second electrode away from the first electrode; or the color filter layer is disposed at a side of the first electrode away from the second electrode. The color filter layer covers the light modulation structure in the display panel.

In another aspect, a driving method applied to the display panel as described in any of the above embodiments. The driving method includes: inputting a pixel voltage to the first electrode and inputting a common voltage to the second electrode simultaneously, and controlling the refractive index of the refractive index adjustment layer to be changed under the action of the electric field between the first electrode and the second electrode, so that the corresponding sub-pixel in the display panel realizes display of different gray scales.

In some embodiments, in a case where a direction of the electric field is directed from the first electrode to the second electrode, and the common voltage is unchanged, the refractive index of the refractive index adjustment layer decreases as the pixel voltage increases; and in a case where the direction of the electric field is directed from the second electrode to the first electrode, and the common voltage is unchanged, the refractive index of the refractive index adjustment layer increases as the pixel voltage increases.

In yet another aspect, a display system is provided. The display system includes: the display panel as described in any of the above embodiments; and a light source configured to supply light beams for illumination to the display panel.

In some embodiments, the light source is disposed at a side of the display panel, and a light exit surface of the light source is parallel to a display surface of the display panel.

In some embodiments, the light source is disposed at a side of the first electrode away from the second electrode.

In some embodiments, the light source is disposed at a side of the display panel, and a plane where the light exit surface of the light source is located intersects with a plane where the display surface of the display panel is located. The display system further includes a transflective mirror and a reflective mirror disposed on a light exit path of the light source, and the transflective mirror is disposed between the reflective mirror and the light source. The transflective mirror is configured to transmit light emitted from the light source, so that the light is directed to the reflective mirror, and reflect the light reflected by the reflective mirror to the display panel.

In some embodiments, the transflective mirror is disposed at a side of the first electrode away from the second electrode. The display system further includes a lens, and the lens is disposed at a side of the transflective mirror away from the display panel.

In some embodiments, the display system includes a processor, and the processor is electrically connected to the display panel. The processor is configured to output display signals corresponding to a display image to the display panel.

BRIEF DESCRIPTION OF THE DRAWINGS

In order to describe technical solutions in the present disclosure more clearly, accompanying drawings to be used in some embodiments of the present disclosure will be introduced briefly. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual dimensions of products, actual processes of methods and actual timings of signals that the embodiments of the present disclosure relate to.

DETAILED DESCRIPTION

Technical solutions in some embodiments of the present disclosure will be described clearly and completely with reference to accompanying drawings. Obviously, the described embodiments are merely some but not all embodiments of the present disclosure. All other embodiments obtained on a basis of embodiments of the present disclosure by a person of ordinary skill in the art shall be included in the protection scope of the present disclosure.

Unless the context requires otherwise, terms "comprise" and other forms thereof such as the third-person singular form "comprises" and the present participle form "comprising" in the description and the claims are construed as an open and inclusive meaning, i.e., "included, but not limited to". In the description, terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials or characteristics may be included in any one or more embodiments/examples in any suitable manner.

Terms such as "first" and "second" are only used for descriptive purposes, and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a/the plurality of" means two or more unless otherwise specified.

The expression "at least one of A, B and C" has a same meaning as the expression "at least one of A, B or C", and both include the following combinations of A, B and C: only A, only B, only C, a combination of A and B, a combination of A and C, a combination of B and C, and a combination of A, B and C. The expression "A and/or B" includes the following three combinations: only A, only B, and a combination of A and B.

In the related art, a holographic display device uses a liquid crystal spatial light modulator to load holographic interference images. However, liquid crystal molecules in a liquid crystal spatial light modulator are prone to stay in a polarized state, which causes image quality of the holographic display device to be easily affected, thereby reducing display effect of the holographic display device.

Figure 1:
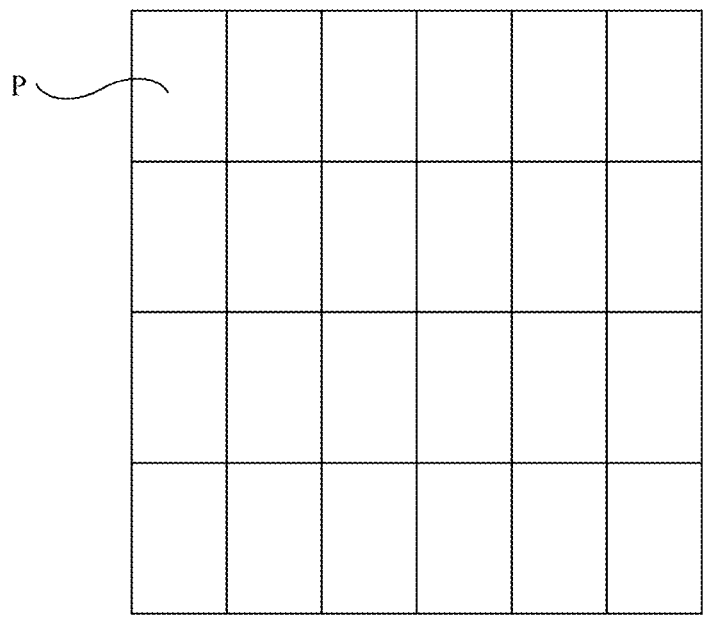
FIG. 1 is a schematic diagram of a division of a plurality of sub-pixel regions of a display panel, in accordance with some embodiments of the present disclosure.

Some embodiments of the present disclosure provide a display panel 01. As shown in FIG. 1, the display panel 01 includes a plurality of sub-pixel regions P for accommodating a plurality of sub-pixels. For example, the plurality of sub-pixel regions P may be defined by a plurality of gate lines and a plurality of data lines in the display panel 01 that cross vertically and horizontally, and each sub-pixel region P is used to accommodate one sub-pixel.

Figure 2:
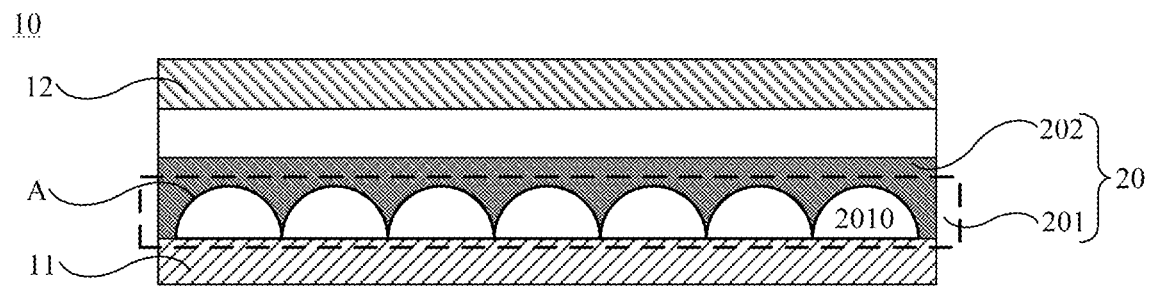
FIG. 2 is a partial structural diagram of a display panel, in accordance with some embodiments of the present disclosure.

As shown in FIG. 2, the display panel 01 further includes a plurality of sub-pixels 10. At least one of the plurality of sub-pixels 10 includes: a first electrode 11, a light modulation structure 20 disposed on a side of the first electrode 11, and a second electrode 12 disposed at a side of the light modulation structure 20 away from the first electrode 11.

It will be noted that, in some embodiments of the present disclosure, each of the plurality of sub-pixels 10 includes a first electrode, a light modulation structure and a second electrode. That is, the display panel 10 may include a plurality of second electrodes 12, each second electrode 12 is disposed in one sub-pixel 10, and the second electrode 12 covers the light modulation structure 20 located in the same sub-pixel 10 as the second electrode 12. In this case, in a display process, voltages applied by the plurality of second electrodes 12 located in different sub-pixels 10 may be the same or different.

In some other embodiments of the present disclosure, each of the plurality of sub-pixels 10 includes the first electrode, the light modulation structure and the second electrode, and all second electrodes included in the plurality of sub-pixels are connected together to form an entire layer. In this case, the light modulation structures 20 included in the plurality of sub-pixels may share a second electrode layer (the second electrode layer is an entire layer formed by the plurality of second electrodes 12 connected together). That is, in this case, the second electrode layer is able to cover all light modulation structures 20 in the display panel 01.

For example, the first electrode 11 is referred to as a pixel electrode, and the second electrode 12 is referred to as a common electrode. A material of the first electrode 11 and a material of the second electrode 12 may be a transparent conductive material. For example, the material may be at least one of indium tin oxide (ITO) or indium zinc oxide (IZO).

In some embodiments described above, as shown in FIG. 2, the light modulation structure 20 includes a light modulation layer 201 and a refractive index adjustment layer 202.

The refractive index adjustment layer 202 is disposed between the first electrode 11 and the second electrode 12. In this case, a refractive index of the refractive index adjustment layer 202 may be changed under action of an electric field between the first electrode 11 and the second electrode 12. That is, when voltages are applied to the first electrode 11 and the second electrode 12, an electric field is generated between the first electrode 11 and the second electrode 12, and under the action of the electric field, the refractive index of the refractive index adjustment layer 202 may be changed as the magnitude and direction of the electric field change.

For example, a material of the refractive index adjustment layer 202 includes an electro-optic crystal material. Under action of an external electric field, a refractive index of the electro-optic crystal material may be changed.

On this basis, referring to FIG. 2, at least a part of a surface A of the light modulation layer 201 that is in contact with the refractive index adjustment layer 202 is a curved face. In this way, an incident angle θ of light that is incident on the surface A of the light modulation layer 201 that is in contact with the refractive index adjustment layer 202 may be adjusted.

Figure 3:
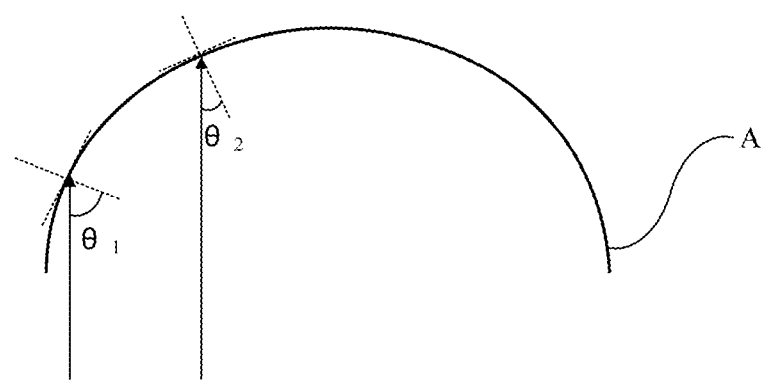
FIG. 3 is a schematic diagram of light propagation in the light modulation layer in FIG. 2.

As shown in FIG. 3, at least a part of the surface A of the light modulation layer 201 that is in contact with the refractive index adjustment layer 202 is a curved face. In this case, with respect to the light reaching different positions of the surface A of the light modulation layer 201 that is in contact with the refractive index adjustment layer 202, since the direction of the normal of the surface is different, incident angles $\theta_1$ and $\theta_2$ of the light are different.

In summary, the display panel 01 provided by some embodiments of the present disclosure includes the light modulation structure 20, and the light modulation structure 20 includes the light modulation layer 201 and the refractive index adjustment layer 202 that are in contact with each other. The refractive index of the refractive index adjustment layer 202 may be changed as the electric field between the first electrode 11 and the second electrode 12 changes. A total reflection angle α of light incident on the surface A of the light modulation layer 201 that is in contact with the refractive index adjustment layer 202 is related to the refractive index of the refractive index adjustment layer 202. Therefore, by changing the electric field between the first electrode 11 and the second electrode 12, a purpose of adjusting the total reflection angle α of the light incident on the surface A of the light modulation layer 201 that is in contact with the refractive index adjustment layer 202 may be achieved.

For example, the refractive index of the light modulation layer 201 is $n_1$, under the action of the electric field between the first electrode 11 and the second electrode 12, the refractive index of the refractive index adjustment layer 202 is $n_2$. In this case, the total reflection angle α is:

$$\alpha = \arcsin\frac{n_2}{n_1} \quad (1)$$

On this basis, since at least a part of the surface A of the light modulation layer 201 that is in contact with the refractive index adjustment layer 202 is a curved face, the incident angle θ of the light incident on the surface A where the light modulation layer is in contact with the refractive index adjustment layer may be adjusted by the light modulation layer 201.

Figure 4A:
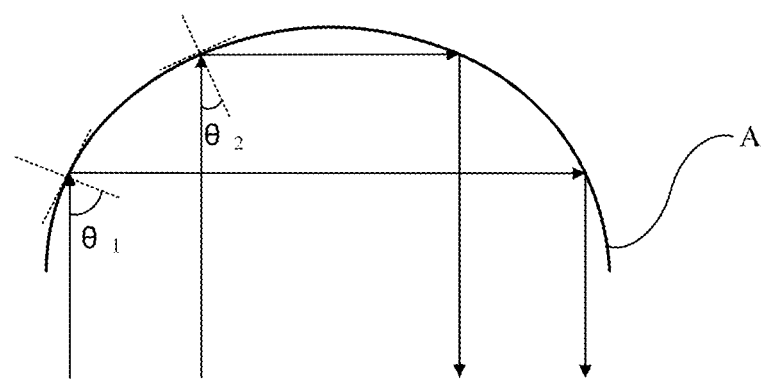
FIG. 4a is a schematic diagram of another light propagation in the light modulation layer in FIG. 2.

In this case, in a case where the total reflection angle α has a minimum value, the incident angle of light at any position of the surface A of the light modulation layer 201 that is in contact with the refractive index adjustment layer 202, for example, the incident angles $\theta_1$ and $\theta_2$ in FIG. 3, may be greater than the total reflection angle α, and the light incident on the light modulation structure 20, as shown in FIG. 4a, is totally reflected. Herein, it will be noted that, under the action of the electric field between the first electrode 11 and the second electrode 12, the refractive index $n_2$ of the refractive index adjustment layer 202 may approach 0, and thus the minimum value of the total reflection angle α may also approach 0 degree.

Figure 4B:
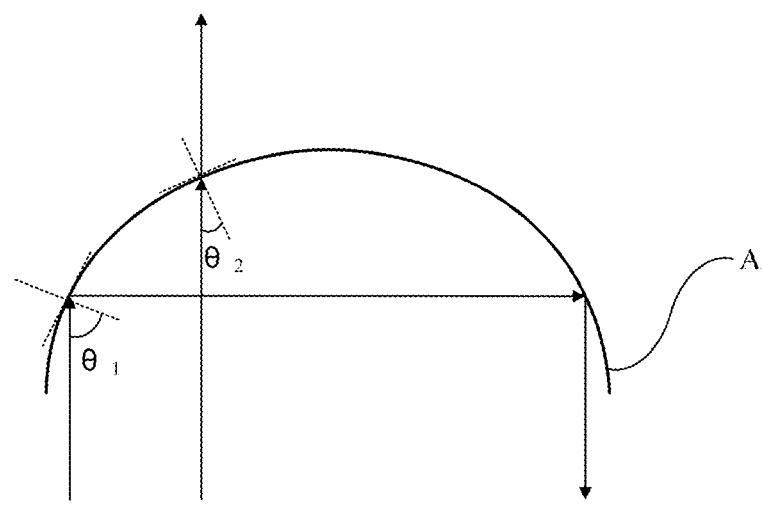
FIG. 4b is a schematic diagram of yet another light propagation in the light modulation layer in FIG. 2.

When the refractive index $n_2$ of the refractive index adjustment layer 202 increases by changing the electric field between the first electrode 11 and the second electrode 12, and thereby the total reflection angle α increases, the incident angle $\theta_1$ may be greater than α, and the incident angle $\theta_2$ may be less than $\alpha$. In this case, as shown in FIG. 4b, the light incident on the surface A at the incident angle $\theta_1$ is totally reflected in the light modulation layer 201, and the light incident on the surface A at the incident angle $\theta_2$ is able to pass through the light modulation layer 201 and enter the refractive index adjustment layer 202.

Figure 4C:
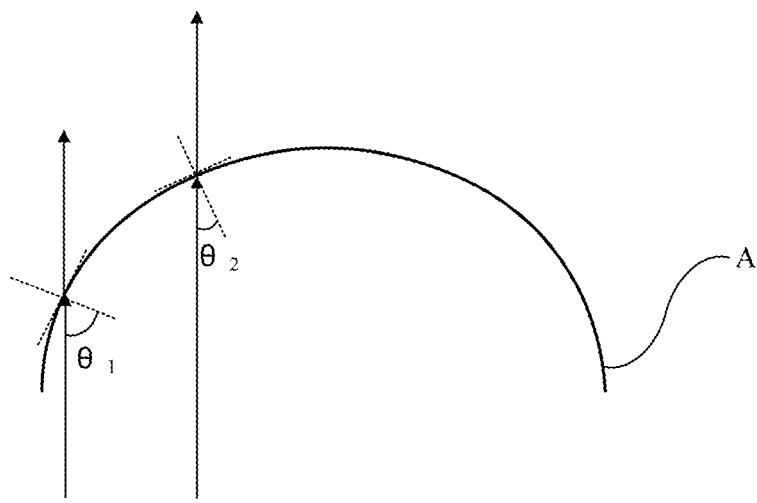
FIG. 4c is a schematic diagram of yet another light propagation in the light modulation layer in FIG. 2.

When the refractive index $n_2$ of the refractive index adjustment layer 202 continuously increases by changing the electric field between the first electrode 11 and the second electrode 12, and thereby the total reflection angle $\alpha$ continuously increases, both the incident angle $\theta_1$ and the incident angle $\theta_2$ may be less than $\alpha$. In this case, as shown in FIG. 4c, the light incident on the surface A at the incident angle $\theta_1$ and the light incident on the surface A at the incident angle $\theta_2$ can pass through the light modulation layer 201 and enter the refractive index adjustment layer 202. Herein, it will be noted that, when the refractive index $n_2$ of the refractive index adjustment layer 202 is increased to be equal to the refractive index $n_1$ of the light modulation layer 201, the total reflection angle $\alpha$ may reach a maximum value, which is 90 degrees.

As will be seen from the above, under action of the first electrode 11, the second electrode 12 and the light modulation structure 20, with respect to the light incident on the light modulation structure 20, the amount of light passing through the light modulation structure 20 or the amount of light reflected by the light modulation structure 20 may be adjusted, so that the display panel 01 may display an image with different gray scales.

Figure 5:
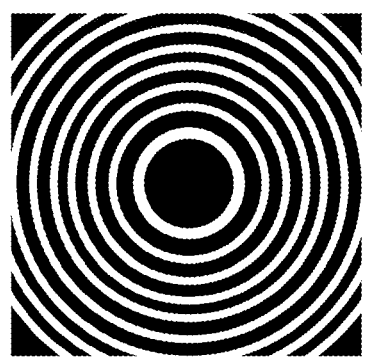
FIG. 5 is a schematic diagram of a holographic interference image, in accordance with some embodiments of the present disclosure.

In this case, the display panel 01 may be used to load holographic interference fringes with different gray scales, such as the holographic interference fringes shown in FIG. 5. In this way, a display device using the display panel 01 may display holographic images. In this case, the display device does not need to load the holographic interference fringes through the liquid crystal spatial light modulator having liquid crystal molecules. Therefore, it is possible to avoid a problem of degradation of displayed image quality due to the polarization of liquid crystal molecules.

There are various forms of structures of the light modulation layer 201, and a structure of the light modulation layer 201 will be described in detail below with reference to the drawings and some examples.

Figure 6:
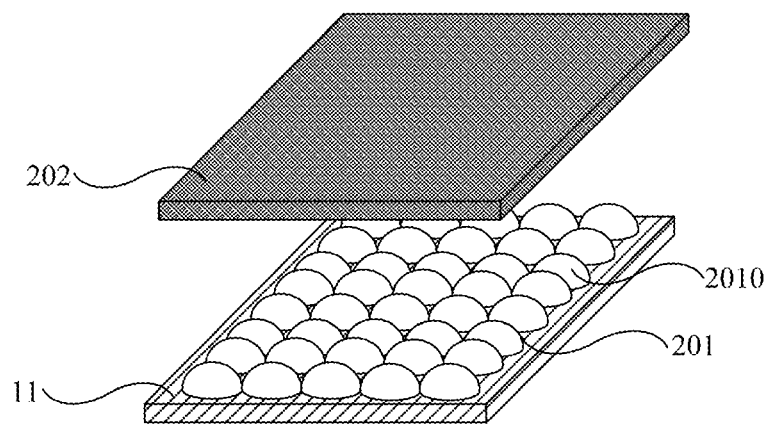
FIG. 6 is a structural diagram of a light modulation structure in FIG. 2.

As shown in FIG. 6, in some embodiments, the light modulation layer 201 includes a plurality of protrusions 2010. The plurality of protrusions 2010 are distributed on a surface of the first electrode 11 facing the refractive index adjustment layer 202.

In addition, as shown in FIG. 2, a surface A of the protrusion 2010 that is in contact with the refractive index adjustment layer 202 is a curved face. In this case, since the light modulation layer 201 includes a plurality of protrusions 2010, an area of the surface A of the light modulation 201 that is in contact with the refractive index adjustment layer 202 may be increased due to the plurality of protrusions 2010, which makes the above reflection and/or transmission phenomenon of the incident light occurs on the surface of each protrusion 2010 that is in contact with the refractive index adjustment layer 202, thereby improving light emission efficiency and uniformity of the light exiting from the light modulation structure 20.

The present disclosure does not limit a method of manufacturing the light modulation layer 201 composed of the plurality of protrusions 2010. For example, the plurality of protrusions 2010 may be formed on the surface of the first electrode 11 facing the second electrode 12 by using an inkjet printing method.

On this basis, for example, the plurality of protrusions 2010 are arranged in an array (e.g., a matrix), and the shapes and sizes of any two protrusions 2010 are the same. In this way, a process of manufacturing the light modulation layer 201 may be simplified without additionally adjusting manufacturing parameters in order to manufacture protrusions 2010 with different specifications. In addition, the plurality of protrusions 2010 arranged in a matrix may make the light exiting from the light modulation structure 20 more uniform.

For example, the surface of each protrusion that is in contact with the refractive index adjustment layer 202 is a hemispherical face. In this way, the amount of light, which is incident on the light modulation layer 201, exiting at a position of each protrusion 2010 may be increased.

Figure 7:
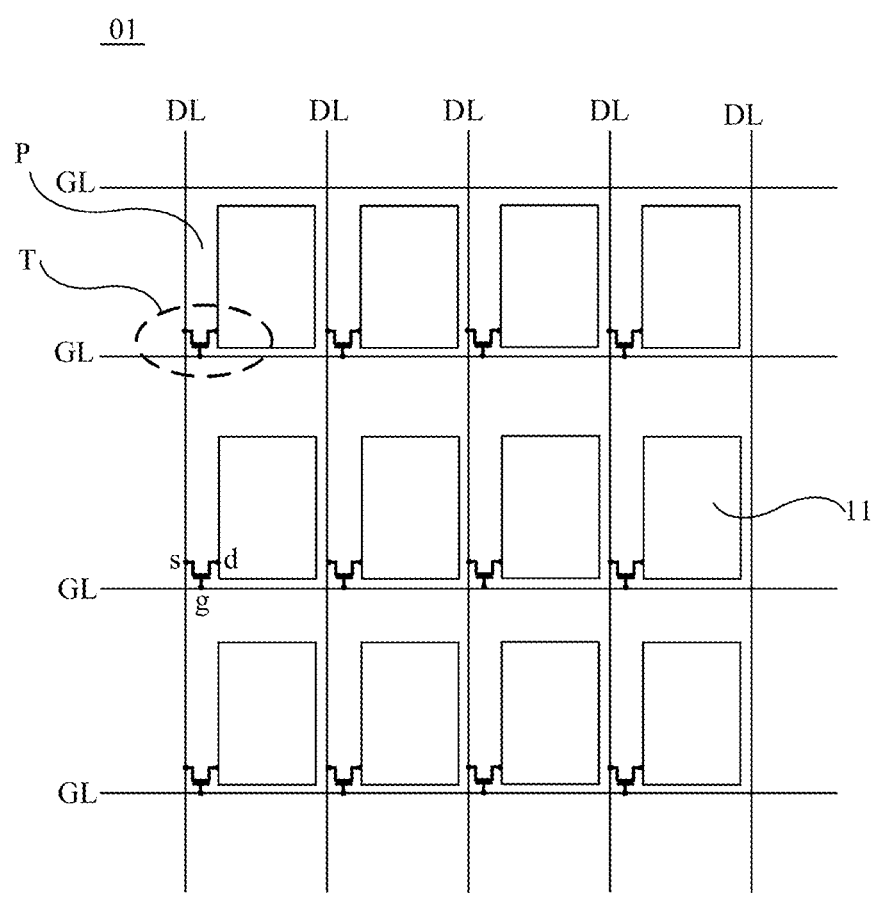
FIG. 7 is a schematic diagram of another division of sub-pixel regions of a display panel, in accordance with some embodiments of the present disclosure.
Figure 8:
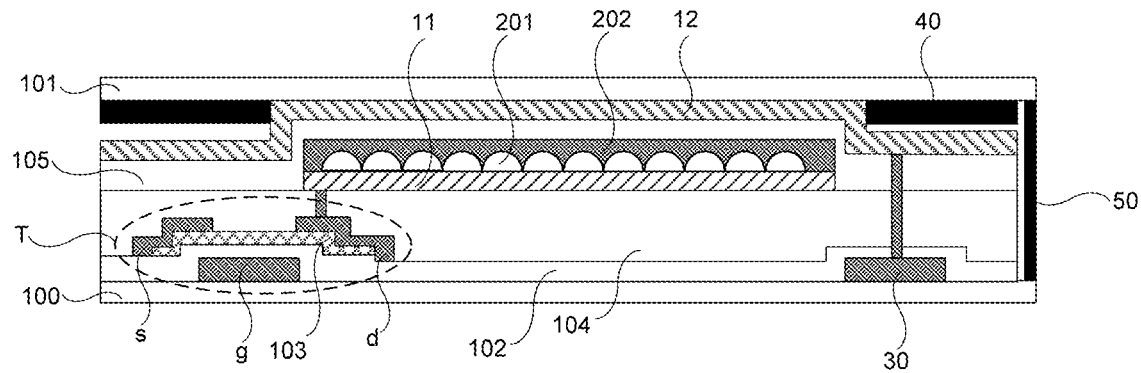
FIG. 8 is a structural diagram of a display panel, in accordance with some embodiments of the present disclosure.

In addition, in order to charge the first electrode 11 in each sub-pixel, in some embodiments, as shown in FIGS. 7 and 8, the display panel 01 further includes a base substrate 100, and a plurality of gate lines (GL) and a plurality of data lines (DL) on the base substrate 100 that cross horizontally and vertically. The plurality of gate lines GL and the data lines DL cross to define the plurality of sub-pixel regions P.

In the example, the display panel 01 further includes a transistor T disposed in each sub-pixel region P, a gate (g) of the transistor is electrically connected to the gate line GL, a first electrode (e.g., a source s) of the transistor is electrically connected to the data line DL, and a second electrode (e.g., a drain d) of the transistor is electrically connected to the first electrode 11 in the sub-pixel.

For example, as shown in FIG. 8, a surface of the gate g of the transistor T facing away from the base substrate 100 is covered with a gate insulating layer 102, and there is an active layer 103 between the gate insulating layer and both the source s and the drain d of the transistor T. Surfaces of the source s and the drain d of the transistor T facing away from the base substrate 100 are covered with a first insulating layer 104, and a second insulating layer 105 is disposed between the refractive index adjustment layer 202 and the second electrode 12. The first electrode 11, the light modulation layer 201 and the refractive index adjustment layer 202 are disposed between the first insulating layer 104 and the second insulating layer 105.

In this case, after a gate scanning signal is input to a gate line GL to gate the gate line GL, the gate line GL that is gated is able to turn on the transistor T electrically connected thereto, and then a data voltage Vdata on the data line DL may be transmitted to the first electrode 11 electrically connected to the transistor T through the turned-on transistor T, and the first electrode 11 is charged.

In addition, in order to supply power to the second electrode 12, for example, as shown in FIG. 8, the display panel 01 further includes a power supply electrode 30 disposed in each sub-pixel 10. The power supply electrode 30 is electrically connected to the second electrode 12 through a through hole disposed in the insulating layers. The power supply electrode 30 is used to supply a common voltage to the second electrode 12.

On this basis, in order to simplify the manufacturing process, for example, the power supply electrode 30 and the gate g of the transistor T may be disposed in a same layer and be made of a same material. In this way, the power supply electrode 30 and the gate g of the transistor may be synchronously manufactured through a single patterning process.

In this case, by supplying a voltage to the power supply electrode 30, the second electrode 12 may be charged through the power supply electrode 30.

It will be noted that, in some embodiments of the present disclosure, the patterning process may refer to a process that includes a photolithography process, or includes a photolithography process and an etching process, which may also include other processes for forming predetermined patterns, such as printing, and inkjet. The photolithography process refers to a process for forming a pattern by using photoresist, a mask, an exposure machine, etc., which includes film formation, exposure, development and other processes. A corresponding patterning process may be selected according to the structure formed in the present disclosure. In a single patterning process in some embodiments of the present disclosure, it is described as an example for illustration that different exposure regions are formed through a single mask exposure process, and then the different exposure regions are subjected to removal processes, such as etching, and asking, multiple times to finally obtain a desired pattern.

In addition, the display panel 01 further includes a cover plate 101 covering the second electrode 12. A material constituting the cover plate 101 may be transparent glass or a transparent resin material.

On this basis, in order to prevent external light from passing through the transparent cover plate 101 and irradiating the active layer 103 of the transistor T, which will adversely affect performance of the transistor T, for example, as shown in FIG. 8, the display panel 01 further includes a black matrix 40 disposed on a side of the cover plate 101 proximate to the base substrate 100 and at a side of the second electrode 12 away from the first electrode 11.

The black matrix 40 may cover at least a part of the transistor T. For example, an orthographic projection of the black matrix 40 on the base substrate 100 may overlap with at least a part of an orthographic projection of the active layer of the transistor T on the base substrate 100. In addition, in order to block a non-light exit region of the display panel 01 and reduce defects caused by light reflection of metal lines or other photoelectric effects, for example, the black matrix 40 may also cover at least a part of the plurality of gate lines GL and at least a part of the plurality of data lines DL. That is, the orthographic projection of the black matrix 40 on the base substrate 100 overlaps with an orthographic projection of at least a part of the plurality of gate lines GL on the base substrate 100 and with an orthographic projection of at least a part of the plurality of data lines DL on the base substrate 100.

In some embodiments, a sealant 50 is disposed at an edge of a display region in the display panel 01 where is provided with the plurality of sub-pixels 10, and the display region and a non-display region can be isolated by the sealant 50.

Figure 10:
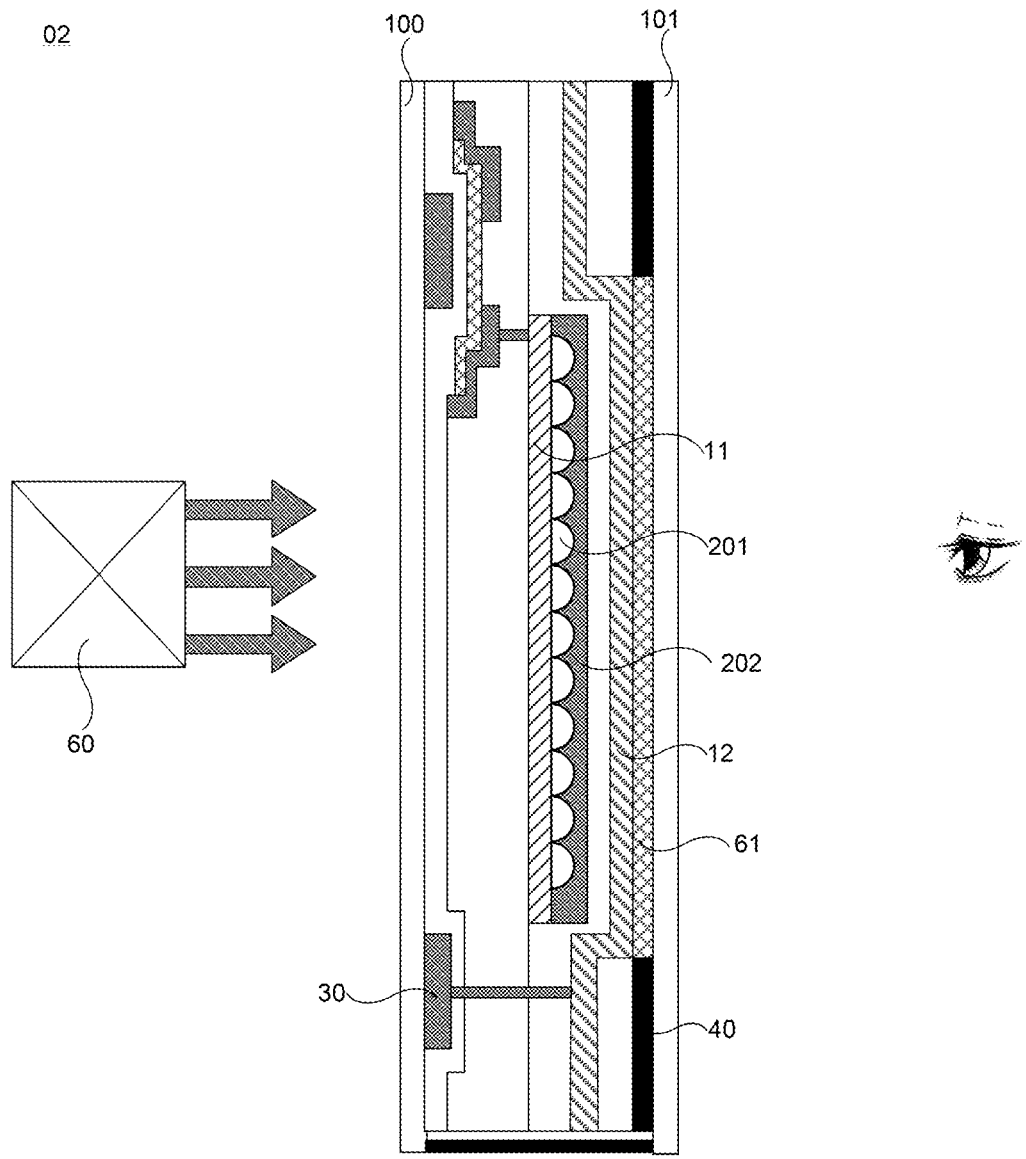
FIG. 10 is a structural diagram of a display system, in accordance with some embodiments of the present disclosure.
Figure 11:
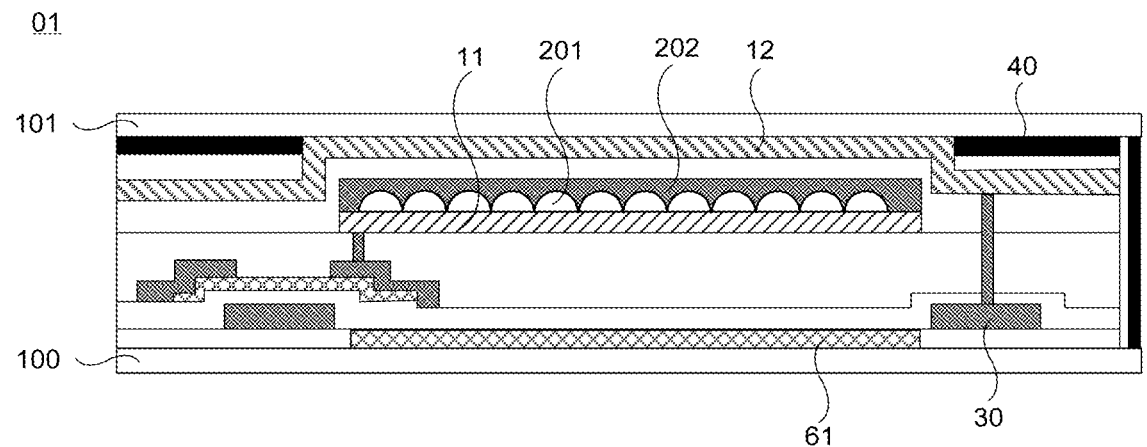
FIG. 11 is a structural diagram of a display panel, in accordance with some embodiments of the present disclosure.
Figure 12:
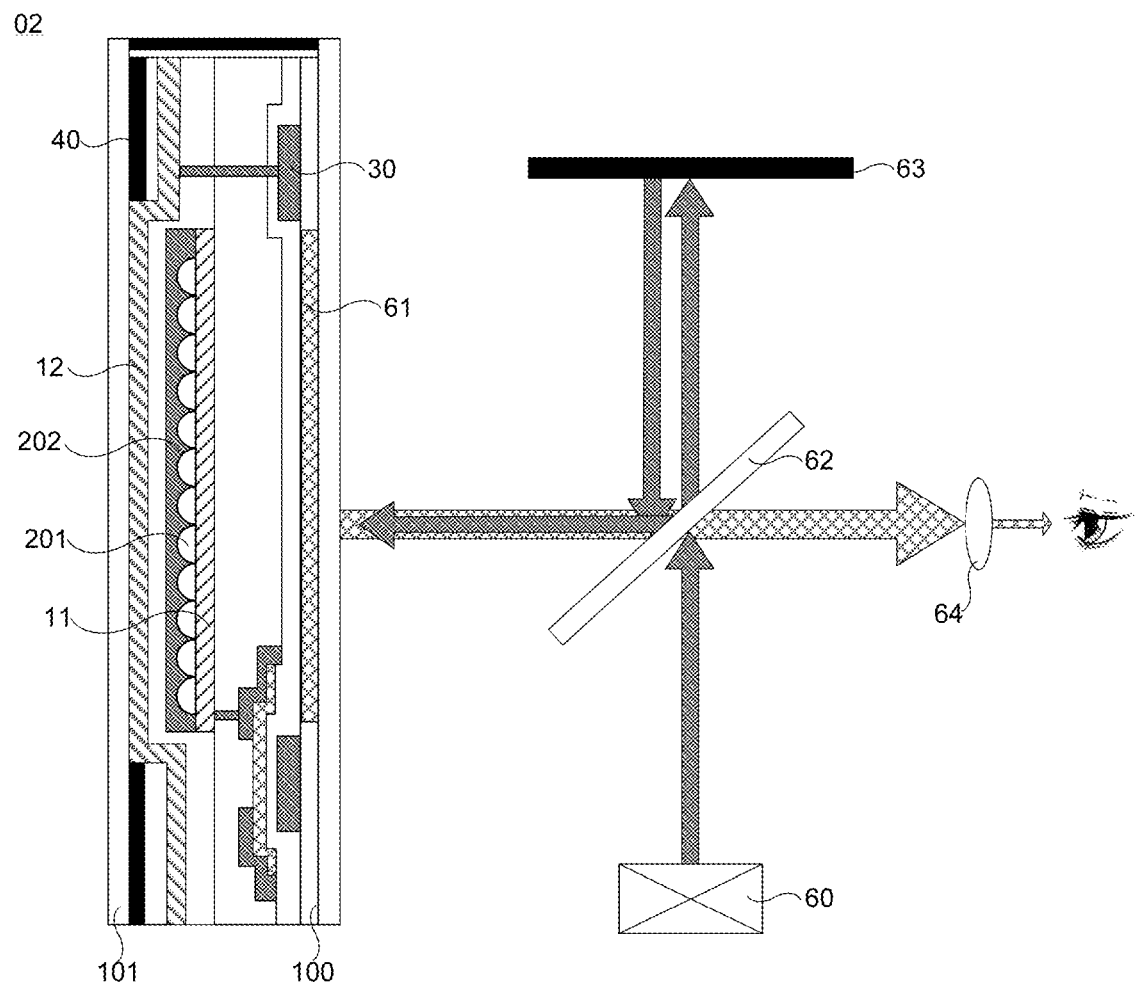
FIG. 12 is a structural diagram of yet another display system, in accordance with some embodiments of the present disclosure.

In some embodiments, referring to FIGS. 10 to 12, a color filter layer 61 is disposed in the display panel 01. For example, as shown in FIG. 10, the color filter layer 61 is disposed on a side of the second electrode 12 away from the first electrode 11; for another example, as shown in FIGS. 11 and 12, the color filter layer 61 is disposed at a side of the first electrode 11 away from the second electrode 12.

The color filter layer 61 covers the light modulation structure in the display panel 01, so that light transmitted or reflected by the light modulation structure is filtered, thereby realizing display of different colors, such as red, blue and green.

Some embodiments of the present disclosure provide a driving method applied to the display panel 01 as described in any of the above embodiments. The driving method includes: inputting a pixel voltage to the first electrode 11 and inputting a common voltage to the second electrode 12 simultaneously, and controlling the refractive index of the refractive index adjustment layer 202 to be changed under the action of the electric field between the first electrode 11 and the second electrode 12, so that the corresponding sub-pixel in the display panel 01 realizes display of different gray scales.

For example, in a case where a direction of the electric field is directed from the first electrode 11 to the second electrode 12, and the common voltage is unchanged, the refractive index of the refractive index adjustment layer 202 decreases as the pixel voltage increases. In a case where the direction of the electric field is directed from the second electrode 12 to the first electrode 11, and the common voltage is unchanged, the refractive index of the refractive index adjustment layer 202 increases as the pixel voltage increases.

The display panel 01 shown in FIG. 8 is taken as an example, some display manners of the display panel 01 will be illustrated below.

Display Manner 1:

In this display manner, voltages are applied to the first electrode 11 and the second electrode 12 respectively, for example, the voltage applied to the first electrode 11 is +8V, and the voltage applied to the second electrode 12 is 0V. In this case, assuming that the refractive index $n_2$ of the refractive index adjustment layer 202 has a minimum value, it will be seen from the above equation (1) that the total reflection angle $\alpha$ of the light incident on the surface A of the light modulation layer 201 that is in contact with the refractive index adjustment layer 202 has a minimum value. It will be understood that the value of the total reflection angle $\alpha$ may be close to zero herein.

Figure 9A:
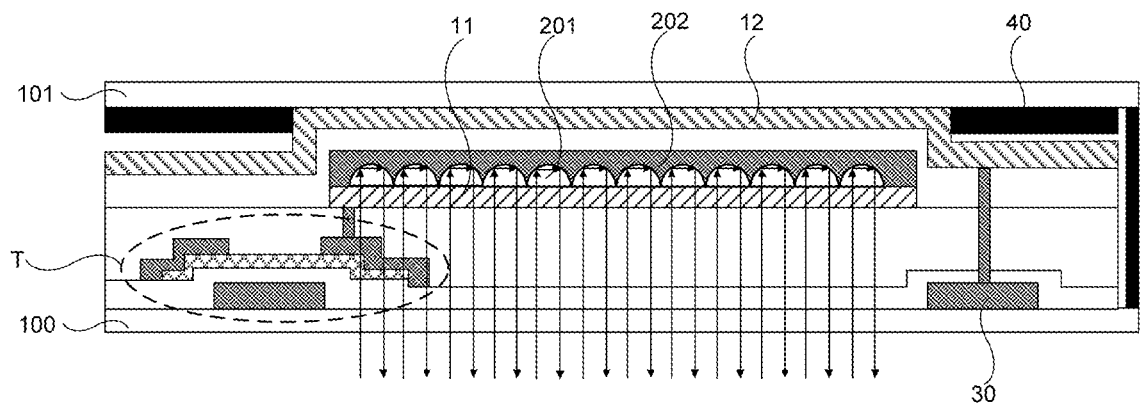
FIG. 9a is a schematic diagram of a display manner of the display panel shown in FIG. 8.

In this case, as shown in FIG. 9a, an incident angle of light from the light source to the light modulation layer 201 at the surface A is greater than the total reflection angle $\alpha$. In this way, all incident light is totally reflected at the surface A of the light modulation layer 201 that is in contact with the refractive index adjustment layer 202, so that no light exits from the light modulation layer 201 and enters the refractive index adjustment layer 202.

On this basis, in the display panel 01, in a case where a side where the base substrate 100 is located is a display side, light provided by the light source exits from the side where the base substrate 100 is located. In this case, the gray scale value displayed by the display panel 01 is the maximum value.

Or, in the display panel 01, in a case where a side where the cover plate 101 opposite to the base substrate 100 is located is a display side, light provided by the light source is all reflected, and thus no light exits from the side where the cover plate 101 is located. In this case, the gray scale value displayed by the display panel 01 is the minimum value, and the display panel is in a dark state.

Display Manner 2:

In this display manner, voltages are applied to the first electrode 11 and the second electrode 12 respectively, for example, the voltage applied to the first electrode 11 is −8V, and the voltage applied to the second electrode 12 is 0V. In this case, assuming that the refractive index $n_2$ of the refractive index adjustment layer 202 increases to be the same as the refractive index $n_1$ of the light modulation layer 201, it will be seen from the above equation (1) that the total reflection angle $\alpha$ of the light incident on the surface A of the light modulation layer 201 that is in contact with the refractive index adjustment layer 202 has a maximum value. It will be understood that the value of the total reflection angle $\alpha$ may be 90 degrees.

Figure 9B:
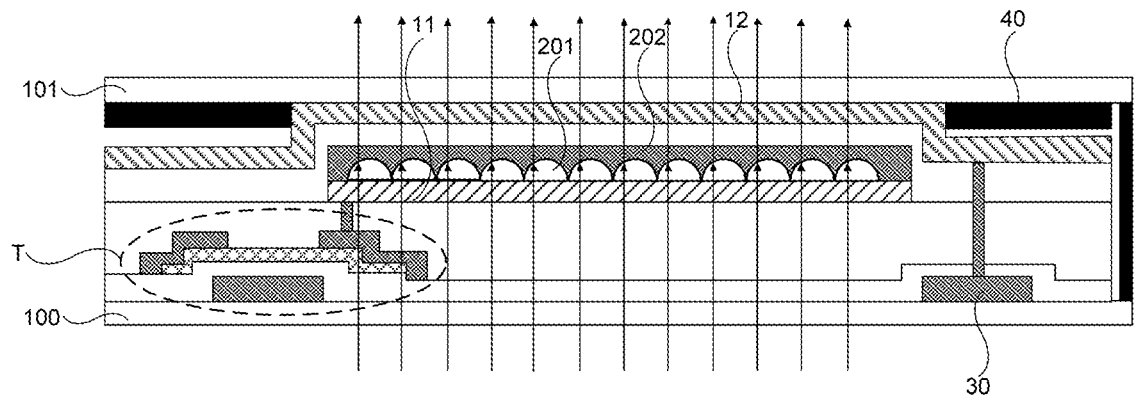
FIG. 9b is a schematic diagram of another display manner of the display panel shown in FIG. 8.

In this case, as shown in FIG. 9b, an incident angle of light from the light source to the light modulation layer 201 at the surface A is less than the total reflection angle α. In this way, all the incident light is able to pass through the light modulation layer 201 and enter the refractive index adjustment layer 202.

On this basis, in the display panel 01, in a case where a side where the base substrate 100 is located is a display side, since the light modulation layer 201 transmits all the light provided by the light source, no light exits from the side where the base substrate 100 is located. In this case, the gray scale value displayed by the display panel 01 is the minimum value and the display panel is in a dark state.

Or, in the display panel 01, in a case where a side where the cover plate 101 is located is a display side, since the light modulation layer 201 transmits all the light provided by the light source, the light all exits from the side where the cover plate 101 is located. In this case, the gray scale value displayed by the display panel 01 is the maximum value.

Display Manner 3:

In this display manner, voltages are applied to the first electrode 11 and the second electrode 12 respectively, for example, the voltage applied to the first electrode 11 is from −8V to +8V, and the voltage applied to the second electrode 12 is 0V. In this case, assuming that the refractive index $n_2$ of the refractive index adjustment layer 202 is between the minimum value of $n_2$ and the value of $n_1$, it will be seen from the above equation (1) that the total reflection angle α of the light incident on the surface A of the light modulation layer 201 that is in contact with the refractive index adjustment layer 202 is between the minimum value of α and the maximum value of α.

Figure 9C:
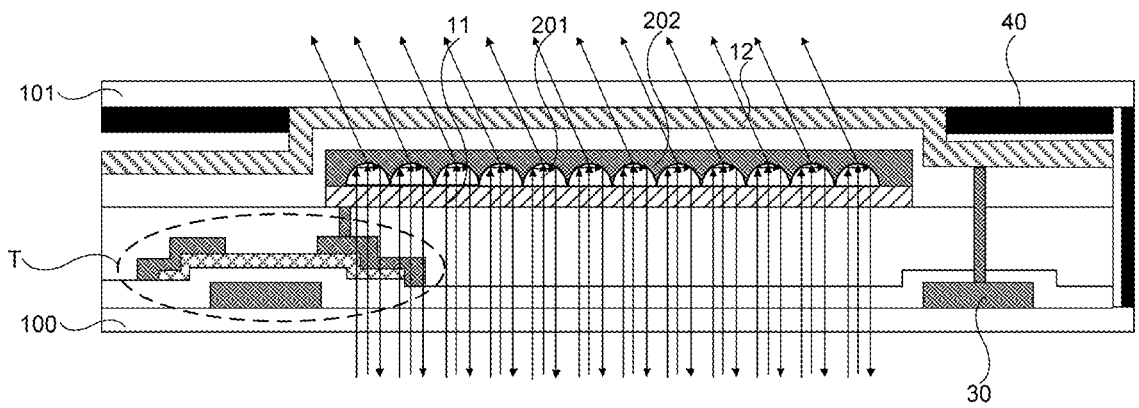
FIG. 9c is a schematic diagram of yet another display manner of the display panel shown in FIG. 8.

In this case, as shown in FIG. 9c, with respect to the light from the light source to the light modulation layer 201, an incident angle of a part of light at the surface A is greater than the total reflection angle α, and thus the part of light is totally reflected; and an incident angle of another part of light at the surface A is less than the total reflection angle α, and thus the part of light passes through the light modulation layer 201 and enters the refractive index adjustment layer 202.

On this basis, a part of the light provided by the light source exits from the side where the base substrate 100 is located, and a part of the light exits from the side where the cover plate 101 is located. Therefore, whether the display side of the display panel 01 is the side where the base substrate 100 is located or the side where the cover plate 101 is located, a gray scale value of an image displayed by the display panel 01 is an intermediate gray scale value between the maximum gray scale value and the minimum gray scale value.

It will be seen from the above display manners that, in the display panel 01, both the side where the base substrate 100 is located and the side where the cover plate 101 is located are able to perform image display, and thus the display panel 01 provided by some embodiments of the present disclosure are able to achieve double-sided display.

Some embodiments of the present disclosure provide a display system. As shown in FIG. 10, the display system 02 includes any display panel 01 as described above and a light source 60. The light source 60 is configured to provide beams for illumination to the display panel 01. The display system 02 in the examples has the same technical effects as the display panel 01 provided by any of the above embodiments, which will not be described herein again.

The display system 02 is able to achieve both a reflection display and a transmission display. The two display manners will be described in detail below.

Referring to FIG. 10, in a case where the display system 02 implements the transmission display, the display system 02 includes the light source 60. For example, the light source 60 is disposed at a side of the display panel 01, for example, the light source 60 is disposed at a side of the first electrode 11 away from the second electrode 12. In addition, a light exit surface of the light source 60 is parallel to a display surface of the display panel 01.

It will be noted that the display surface of the display panel 01 refers to a surface of the display panel 01 on which images are displayed. With respect to the transmission display system, the display surface of the display panel 01 is a plane corresponding to a side where the cover plate 101 of the display panel 01 is located.

In this case, light emitted from the light source 60 is able to pass through the first electrode 11 and be incident on the surface A of the light modulation layer 201 that is in contact with the refractive index adjustment layer 202.

As described above, in a case where the incident angle θ of all the light on the surface A is greater than the total reflection angle α, all the light is totally reflected at the surface A, and thus no light passes through the refractive index adjustment layer 202 and the second electrode 12 and exits from the cover plate 101. In this case, the display panel 01 is in a dark state.

In a case where the incident angle θ of all the light on the surface A is less than the total reflection angle α, all the light passes through the refractive index adjustment layer 202 and the second electrode 12 and exits from the cover plate 101. In this case, the gray scale value displayed by the display panel 01 is the maximum value.

In a case where the incident angle θ of a part of the light on the surface A is greater than the total reflection angle α, and the incident angle θ of a part of the light on the surface A is less than the total reflection angle α, the light with a larger incident angle θ (e.g., $θ_1$ in FIG. 4b) is totally reflected at the surface A, and the light with a smaller incident angle θ (e.g., $θ_2$ in FIG. 4b) passes through the refractive index adjustment layer 202 and the second electrode 12 and exits from the cover plate 101. In this case, the display panel 01 displays intermediate gray scales.

On this basis, in order to achieve a color display, with respect to the display panel 01 for achieving the transmission display, the display panel 01 further includes the color filter layer 61 as described above.

For example, in this case, the color filter layer 61 is disposed on the side of the second electrode 12 away from the first electrode 11, and the color filter layer 61 covers the light modulation structure 20 of the display panel 01. In this case, when light exiting from the light modulation structure 20 is transmitted in a direction toward the cover plate 101, the light is able to pass through the color filter layer 61, so that colored light, such as blue, red or green light, exits from the sub-pixel 10 under the color filtering action of the color filter layer 61.

On this basis, the wavelength of light that is able to pass through the color filter layer 61 in each sub-pixel 10 is different. In this way, light with different colors, such as red light, green light and blue light, exits from the plurality of sub-pixels 10 in the same pixel, respectively.

Referring to FIG. 12, in a case where the display system 02 implements a reflection display, the display system 02 includes the light source 60, a transflective mirror 62 and a reflective mirror 63.

The light source 60 is disposed at a side of the display panel 01. For example, the light source is disposed at a side proximate to the cover plate 101 of the display panel 01; for another example, as shown in FIG. 12, the light source is disposed at a side proximate to the base substrate 100 of the display panel 01. In addition, a plane where the light exit surface of the light source 60 is located intersects with a plane where the display surface of the display panel 01 is located.

It will be noted that, with respect to the display panel 01 capable of realizing the reflection display, the display surface of the display panel 01 may be a plane corresponding to the side where the base substrate 100 in the display panel 01 is located, or may be a plane corresponding to the side where the cover plate 101 in the display panel 01 is located. In this case, it will be seen from the above that since the plane where the light exit surface of the light source 60 is located intersects with the plane where the display surface of the display panel 01 is located, and the light source 60 does not block the display surface of the display panel 01 that is at the side where the light source 60 is located, the display panel 01 is able to realize a double-sided display. That is, human eyes may view a display image at either the side where the base substrate 100 is located or the side where the cover plate 101 is located.

In addition, it will be noted that the plane corresponding to the light exit surface of the light source 60 refers to that an orthographic projection of the light exit surface in the light exit direction is a plane. However, for example, the light exit surface may also be a curved face. Similarly, the plane corresponding to the display surface of the display panel 01 refers to that an orthographic projection of the display surface in a viewing direction of the user is a plane. However, for example, the display surface may also be a curved face.

For example, referring to FIG. 12, the transflective mirror 62 and the reflective mirror 63 are disposed on a light exit path of the light source 60, and the transflective mirror 62 is disposed between the reflective mirror 63 and the light source 60, and a side of the first electrode 11 of the display panel 01 away from the second electrode 12 is proximate to the transflective mirror 62. In this way, the light emitted from the light source 60 is able to travel to the transflective mirror 62, pass through the transflective mirror 62 and travel to the reflective mirror 63. Then the light is reflected to the transflective mirror 62 by the reflective mirror 63, and finally the light reflected by the reflective mirror 63 is reflected to the display panel 01 by the transflective mirror 62.

In this example, referring to FIG. 12, since the side of the first electrode 11 of the display panel 01 away from the second electrode 12 is proximate to the transflective mirror 62, the light emitted by the light source 60 is first incident on the light modulation layer 201 in the light modulation structure 20. Herein, it will be noted that whether light is first incident on the light modulation layer 201 or the refractive index adjustment layer 202, the refractive index of the refractive index adjustment layer 202 may be adjusted by controlling the electric field between the first electrode 11 and the second electrode 12, and an incident angle of light may be adjusted by controlling a shape of the surface of the light modulation layer 201 that is in contact with the refractive index adjustment layer 202. In this way, with respect to the light incident on the light modulation structure 20, the amount of light passing through the light modulation structure 20 or the amount of light reflected by the light modulation structure 20 is adjusted, so that the display panel 01 displays images with different gray scales.

In this case, the light emitted from the light source 60 may be transmitted to the light modulation layer 201 in the display panel 01 through the transflective mirror 62 and the reflective mirror 63. In this case, since the plane where the light exit surface of the light source 60 is located and the plane where the display surface of the display panel 01 is located intersect, in the display panel 01, both the side where the base substrate 100 is located and the side where the cover plate 101 is located are able to display images.

In some embodiments, referring to FIG. 12, the display system further includes a lens 64, the lens 64 and the display panel 01 are disposed at opposite sides of the light exit path of the light source 60, and a position of the lens 64 is opposite to a position of the display panel 01. In this case, the lens 64 is able to converge an image displayed on the display panel 01 to a viewing position.

On this basis, in order to achieve a color display, for example, the display panel 01 further includes the color filter layer 61 as described above. In this case, the color filter layer 61 covers the light modulation structure 20 of the display panel 01. The function and technical effect of the color filter layer 61 are as described above, and will not be described herein again.

For example, the light source 60 may be a light-emitting diode (LED) or a laser, which is not limited thereto.

Figure 13:
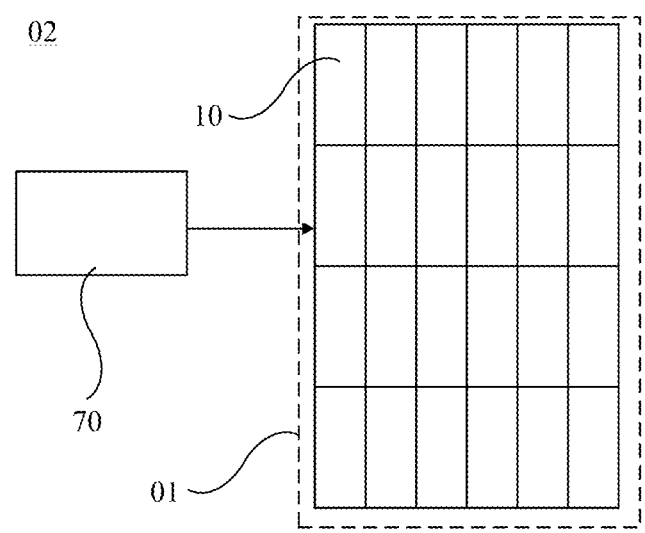
FIG. 13 is a structural diagram of yet another display system, in accordance with some embodiments of the present disclosure.

In addition, with respect to the transmission or reflection display system described above, as shown in FIG. 13, the display system further includes a processor 70. The processor 70 is electrically connected to the display panel 01, and the processor 70 is configured to output display signals corresponding to a display image to the display panel 01.

In some embodiments of the present disclosure, the display image may be a 2D image. In this case, the display panel 01 in the display system is able to display the 2D image.

Or, in some other embodiments of the present disclosure, the display image may be a holographic interference fringe image. After the display panel 01 displays the holographic interference fringe image, the light from the light source 60 is irradiated onto the display panel 01 to reproduce the holographic image, thereby achieving a holographic display.

The foregoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A driving method of a display panel, wherein the display panel comprises a plurality of sub-pixels;
   wherein at least one sub-pixel of the plurality of sub-pixels includes:
   a first electrode;
   a light modulation structure disposed on a side of the first electrode; and
   a second electrode disposed at a side of the light modulation structure away from the first electrode;
   wherein the light modulation structure includes:
   a refractive index adjustment layer; and
   a light modulation layer disposed between the refractive index adjustment layer and the first electrode, the light modulation layer is in contact with the refractive index adjustment layer, and at least a part of a surface of the light modulation layer that is in contact with the refractive index adjustment layer is a curved face;

wherein the driving method of the display panel comprises:

inputting a pixel voltage to the first electrode and inputting a common voltage to the second electrode simultaneously, and controlling a refractive index of the refractive index adjustment layer to be changed under action of an electric field between the first electrode and the second electrode, so that the corresponding sub-pixel in the display panel realizes display of different gray scales.

2. The driving method according to claim 1, wherein in a case where a direction of the electric field is directed from the first electrode to the second electrode, and the common voltage is unchanged, the refractive index of the refractive index adjustment layer decreases as the pixel voltage increases; and in a case where the direction of the electric field is directed from the second electrode to the first electrode, and the common voltage is unchanged, the refractive index of the refractive index adjustment layer increases as the pixel voltage increases.

3. A display system, comprising:

a display panel comprising a plurality of sub-pixels; wherein at least one sub-pixel of the plurality of sub-pixels includes:

a first electrode;

a light modulation structure disposed on a side of the first electrode; and a second electrode disposed at a side of the light modulation structure away from the first electrode;

wherein the light modulation structure includes:

a refractive index adjustment layer, and a refractive index of the refractive index adjustment layer is changed under action of an electric field between the first electrode and the second electrode; and a light modulation layer disposed between the refractive index adjustment layer and the first electrode, the light modulation layer is in contact with the refractive index adjustment layer, and at least a part of a surface of the light modulation layer that is in contact with the refractive index adjustment layer is a curved face;

a light source configured to supply beams for illumination to the display panel;

wherein the light source is disposed at a side of the display panel, and a plane where a light exit surface of the light source is located intersects with a plane where a display surface of the display panel is located; and the display system further comprises:

a transflective mirror and a reflective mirror disposed on a light exit path of the light source, and the transflective mirror is disposed between the reflective mirror and the light source; and the transflective mirror is configured to transmit light emitted from the light source, so that the light is directed to the reflective mirror, and reflect the light reflected by the reflective mirror to the display panel.

4. The display system according to claim 3, wherein the transflective mirror is disposed at a side of the first electrode away from the second electrode; and the display system further comprises a lens disposed at a side of the transflective mirror away from the display panel.

5. The display system according to claim 3, comprising a processor electrically connected to the display panel; wherein the processor is configured to output display signals corresponding to a display image to the display panel.

6. The display system according to claim 3, wherein the light modulation layer includes a plurality of protrusions, and the plurality of protrusions are distributed on a surface of the first electrode facing the refractive index adjustment layer; and a surface of at least one protrusion of the plurality of protrusions that is in contact with the refractive index adjustment layer is a curved face.

7. The display system according to claim 6, wherein the plurality of protrusions are arranged in an array, and shapes and sizes of the plurality of protrusions are the same.

8. The display system according to claim 6, wherein the plurality of protrusions are arranged in a matrix, and shapes and sizes of the plurality of protrusions are the same.

9. The display system according to claim 6, wherein the surface of the at least one protrusion of the plurality of protrusions that is in contact with the refractive index adjustment layer is a hemispherical face.

10. The display system according to claim 3, wherein a material constituting the refractive index adjustment layer includes an electro-optic crystal material.

11. The display system according to claim 3, wherein each sub-pixel includes the first electrode, the light modulation structure and the second electrode; and all second electrodes included in the plurality of sub-pixels are connected together to form a single entire layer.

12. The display system according to claim 3, wherein the display panel further comprises:

a base substrate; and a plurality of gate lines and a plurality of data lines disposed in the display panel, wherein the plurality of gate lines and the plurality of data lines cross horizontally and vertically to define a plurality of sub-pixel regions for accommodating the plurality of sub-pixels.

13. The display system according to claim 12, wherein the display panel further comprises a transistor disposed in each sub-pixel region of the plurality of sub-pixel regions; and a gate of the transistor is electrically connected to a corresponding gate line of the plurality of gate lines, a first electrode of the transistor is electrically connected to a corresponding data line of the plurality of data lines, and a second electrode of the transistor is electrically connected to the first electrode of a sub-pixel in the sub-pixel region where the transistor is located.

14. The display system according to claim 13, wherein the display panel further comprises a black matrix;

the black matrix is disposed on a side of the second electrode away from the first electrode; and the black matrix covers at least a part of the transistor; and/or, the black matrix covers at least a part of the plurality of gate lines and at least a part of the plurality of data lines.

15. The display system according to claim 3, wherein the display panel further comprises a power supply electrode; and the power supply electrode is electrically connected to the second electrode, and the power supply electrode is configured to supply a common voltage to the second electrode.

16. The display system according to claim 3, wherein the display panel further comprises a color filter layer;

the color filter layer is disposed on a side of the second electrode away from the first electrode; or the color filter layer is disposed at a side of the first electrode away from the second electrode; and the color filter layer covers the light modulation structure in the display panel.

\* \* \* \* \*